(12) United States Patent
Unger

(10) Patent No.: US 7,560,902 B2
(45) Date of Patent: Jul. 14, 2009

(54) DUTY CYCLE CONTROLLER FOR HIGH POWER FACTOR BATTERY CHARGER

(75) Inventor: Thomas Michael Unger, Burnaby (CA)

(73) Assignee: Xantrex International, St. Michael (BB)

( * ) Notice: Subject to any disclaimer, the term of this patent is extended or adjusted under 35 U.S.C. 154(b) by 332 days.

(21) Appl. No.: 11/008,266

(22) Filed: Dec. 10, 2004

(65) Prior Publication Data

US 2006/0125449 A1 Jun. 15, 2006

(51) Int. Cl.
*H02J 7/04* (2006.01)

(52) U.S. Cl. ................ 320/141; 320/125; 320/138; 320/145; 320/163; 323/282

(58) Field of Classification Search ........... 320/106, 320/107, 108, 110, 125, 138, 150, 153, 163, 320/145; 323/282, 284, 285
See application file for complete search history.

(56) References Cited

U.S. PATENT DOCUMENTS

| | | | | |
|---|---|---|---|---|
| 5,438,248 A | * | 8/1995 | Hyuck | 320/106 |
| 5,504,416 A | * | 4/1996 | Holloway et al. | 320/152 |
| 5,554,921 A | * | 9/1996 | Li et al. | 320/106 |
| 5,656,917 A | * | 8/1997 | Theobald | 320/106 |
| 5,850,134 A | * | 12/1998 | Oh et al. | 320/106 |
| 5,969,515 A | * | 10/1999 | Oglesbee | 323/283 |
| 6,124,698 A | * | 9/2000 | Sakakibara | 320/110 |
| 6,215,281 B1 | * | 4/2001 | Koch | 320/150 |
| 6,404,164 B1 | * | 6/2002 | Bean et al. | 320/106 |
| 6,610,941 B2 | * | 8/2003 | Pfeiffer | 200/61.58 R |
| 7,057,372 B2 | * | 6/2006 | Chen et al. | 320/106 |
| 7,061,206 B2 | * | 6/2006 | Yang | 320/106 |
| 7,061,209 B2 | * | 6/2006 | Mori | 320/150 |
| 7,079,038 B2 | * | 7/2006 | Wendelrup et al. | 340/636.1 |
| 2001/0010456 A1 | * | 8/2001 | Kaite et al. | 320/125 |
| 2003/0222620 A1 | * | 12/2003 | Formenti et al. | 320/125 |
| 2004/0075462 A1 | * | 4/2004 | Kizer et al. | 326/29 |
| 2004/0135540 A1 | * | 7/2004 | Ogawa | 320/106 |
| 2004/0189271 A1 | * | 9/2004 | Hansson et al. | 323/283 |
| 2005/0017673 A1 | * | 1/2005 | Tsukamoto et al. | 320/106 |
| 2005/0057217 A1 | * | 3/2005 | Fujimoto | 320/106 |
| 2005/0062455 A1 | * | 3/2005 | Stavely et al. | 320/106 |
| 2005/0200334 A1 | * | 9/2005 | Howard et al. | 320/137 |
| 2005/0275369 A1 | * | 12/2005 | Guang et al. | 320/106 |
| 2006/0022633 A1 | * | 2/2006 | Nguyen | 320/106 |

* cited by examiner

*Primary Examiner*—Akm E Ullah
*Assistant Examiner*—Arun Williams

(57) ABSTRACT

A duty cycle controller apparatus for producing a duty cycle signal for controlling switching of switches of a battery charger having an AC input for receiving power and an output for supplying power to charge a battery in response to switching of the switches, while maintaining a high power factor at the AC input. The duty cycle controller apparatus includes a current command signal generator having a plurality of signal inputs for receiving a plurality of signals representing a plurality of operating conditions of the charger, a plurality of current command outputs and a processor operably configured to generate a plurality of current command signals at the current command outputs in response to respective sets of operating conditions.

30 Claims, 8 Drawing Sheets

DUTY CYCLE CONTROLLER FOR HIGH POWER FACTOR BATTERY CHARGER

BACKGROUND OF THE INVENTION

1. Field of Invention

This invention relates to battery chargers and more particularly to generation of a duty cycle signal for use in controlling switches in a battery charger to control current flow to a battery being charged by the battery charger while maintaining a high power factor at an AC input of the battery charger.

2. Description of Related Art

In conventional battery chargers, AC line voltage is stepped down by a transformer to produce a low voltage AC source which is connected to a switching array including Metal Oxide Semiconductor Field Effect Transistors (MOSFETs) for example, to provide a desired amount of current to a battery to be charged. MOSFETs have some "on" resistance which causes heat to be generated in the MOSFETs due to current flow through semiconductor junctions thereof. This heat can build up, if not properly dissipated, to a point where the MOSFETs can become damaged. Heat however, can be controlled by reducing the amount of current supplied to a battery connected to the charger.

Battery chargers are connected to an AC line circuit through a breaker, such as a 15 Amp breaker, for example and thus it is important not to attempt to draw more current than allowed by the breaker from the AC line circuit. Typically, users of battery chargers have no way of limiting AC line current supplied to a battery charger as most chargers provide few controls and many simply have only a line plug for controlling the operation of the charger. Use of the line plug provides only on/off functions and involves no regard for other circuits that may be supplied by or through the same breaker.

In all battery chargers battery voltage and current must be controlled to avoid damaging the battery being charged. Typically conventional chargers employ circuitry that implements a slow control loop that adjusts the current supplied to the battery to achieve the desired battery voltage. The use of the slow control loop involves producing a current command signal that is shaped to mimic the incoming voltage waveform to produce a high bandwidth AC current command signal to control the current drawn from the AC power source. Since the high bandwidth current command signal mimics the input AC voltage waveform, high power factor is achieved.

However, the above-described methodology only works if the circuit topology permits control of the current. In particular, as long as the instantaneous AC input voltage, divided by the transformer turns ratio, is kept less than the battery voltage, the above methodology can be used to control the current supplied to the battery and maintain a high power factor. Under these conditions, the charger can be operated as a boost converter using either the leakage inductance of the transformer, or a discrete inductor as a boost inductor and the current may be properly controlled.

However, low frequency or hybrid low/high frequency battery chargers (and inverter/chargers) must operate over a wide range of input and output voltage. The turns ratio of the transformer places a limit on the range of input and output voltage over which boost mode (and current control) is possible. When the instantaneous AC input voltage divided by the transformer turns ratio exceeds the battery voltage the battery current is essentially uncontrolled and limited only by parasitic impedances in the AC source, the charger, the battery, and the associated wiring. To avoid this situation, some charger manufacturers employ circuits that adjust the phase angle at which a triac on the AC input is fired, to keep the AC input voltage in an allowable range. However, in this situation only very coarse control of battery current is possible and such control may be unpredictable due to battery and AC source characteristics.

SUMMARY OF THE INVENTION

In accordance with one aspect of the invention, there is provided a duty cycle controller apparatus for producing a duty cycle signal for controlling switching of switches of a battery charger having an AC input for receiving power and an output for supplying power to charge a battery in response to switching of the switches, while maintaining a high power factor at the AC input. The duty cycle controller apparatus includes a current command signal generator having a plurality of signal inputs for receiving a plurality of signals representing a plurality of operating conditions of the charger, a plurality of current command outputs and a processor operably configured to generate a plurality of current command signals at the current command outputs in response to respective sets of operating conditions. The duty cycle controller apparatus further includes a selector operably configured to select a current command signal having a lowest value and produce a lowest current command signal in response thereto. The duty cycle signal controller apparatus further includes a duty cycle signal generator having a battery current signal input, a battery voltage signal input, an AC voltage waveform input, an AC current waveform input and a duty cycle signal output. The duty cycle signal generator is operably configured to produce a duty cycle signal at the duty cycle signal output in response to the lowest current command signal, a battery voltage signal ($V_{BATT}$), a battery current signal ($I_{BATT}$), an AC voltage waveform signal ($V_{AC}$) and an AC current waveform signal ($I_{AC}$).

The current command signal generator may comprise a first current command signal generator for generating a first current command signal (CCS1).

The first current command signal generator may comprise battery type and charger mode signal inputs for receiving a battery type signal and a charger mode signal respectively and a battery voltage signal input for receiving the battery voltage signal ($V_{BATT}$).

The first current command signal generator further comprises a battery voltage command signal generator operably configured to produce a battery voltage command signal in response to the battery type signal and the charger mode signal and includes a difference signal generator operably configured to produce the first current command signal in response to a difference between the battery voltage command signal and the battery voltage signal.

The first current command signal generator further comprises a first current command signal output for providing the first current command signal to the selector.

The current command signal generator may comprise a user interface for producing the battery type signal in response to user input identifying the type of battery being charged.

The current command signal generator may comprise a second current command signal generator operably configured to produce a second current command signal (CCS2).

The second current command signal generator may comprise a temperature signal input for receiving a temperature signal ($T_H$) representing temperature of the charger, a maximum temperature signal input for receiving a maximum temperature signal ($T_{MAX}$) representing maximum temperature of the charger, a derating range signal input for receiving a derating temperature range signal ($T_{DERATERANGE}$) specifying a range of temperature over which charging current must be reduced to avoid overheating the charger and a maximum charger current signal input for receiving a maximum charger current signal ($I_{CHARGEMAX}$) representing maximum battery current to be applied to the battery.

The second current command signal generator further comprises a temperature ratio generator for generating a temperature ratio of a difference between the maximum temperature signal and the temperature signal to the temperature derate range signal and a multiplier for multiplying the maximum charger current signal by the temperature ratio to produce the second current command signal and further comprises a second current command signal output for providing the second current command signal (CCS2) to the selector.

The second current command signal generator may further comprise a clamp for clamping the temperature ratio to an upper bound.

The second current command signal generator may further comprise a low pass filter for filtering the temperature signal prior to supplying the temperature signal to the temperature ratio generator.

The current command signal generator may comprise a third current command signal generator for generating a third current command signal (CCS3).

The third current command signal generator may comprise an efficiency signal input for receiving an efficiency signal (E) representing efficiency of the charger, an AC rms voltage signal input for receiving an AC rms signal ($V_{ACRMS}$) representing input AC rms voltage, a breaker derating signal input for receiving a breaker derating signal (B) representing a derating factor for derating a rated current of a breaker through which AC current is supplied to the charger, a breaker rating current signal input for receiving a breaker rating current signal ($I_{BREAKERRATING}$) representing a rated current of the breaker through which current is supplied to the charger, a load current signal input for receiving a load current signal ($I_{LOAD}$) representing load current supplied to a load connected to the same breaker through which current is supplied to the charger, and a battery voltage signal input for receiving the battery voltage signal ($V_{BATT}$).

The third current command signal generator further includes a computation device in communication with the efficiency signal input, the ACrms voltage signal input, the breaker derating signal input, the breaker rating current signal input, the load current signal input and the battery voltage signal input, for producing the third current command signal (CCS3) according to the relation:

$$CCS3 = \frac{(E)(V_{ACRMS})((B)(I_{BREAKER}) - (I_{LOAD}))}{V_{BATT}}$$

The third current command signal input further includes a third current command output for providing the third current command signal to the selector.

The third current command signal generator may comprise a user interface for producing the breaker rating current signal in response to user input.

The duty cycle controller apparatus may further comprise a user interface for producing the breaker derating signal in response to user input.

The current command signal generator may comprise a fourth current command signal generator for generating a fourth current command signal (CCS4).

The fourth current command generator may comprise a phase control mode signal input for receiving a phase control mode signal indicating whether or not the charger is operating in a phase control mode, a battery voltage signal input for receiving the battery voltage signal ($V_{BATT}$), a high side turns signal input for receiving a signal ($N_H$) representing the number of high side turns of wire on a high voltage side of a transformer of the charger, a low side turns signal input for receiving a signal ($N_L$) representing the number of low side turns of wire on a low voltage side of the transformer, an AC rms voltage signal input for receiving an AC rms signal ($V_{ACRMS}$) representing input AC rms voltage to the charger, a maximum charger current signal input for receiving a maximum charger current signal ($I_{CHARGERMAX}$) representing maximum charger current.

The fourth current command generator may further comprise a computation unit operable to compute the fourth current command signal (CCS4) according to the relation below when the phase mode signal indicates the charger is operating in a phase control mode:

$$CCS4 = \frac{(V_{BATT})(N_H)^*(I_{CHARGERMAX})}{(N_L)(V_{ACRMS}) * 2\sqrt{2}}$$

The computation unit is operable to cause the fourth current command signal to be equal to the maximum battery current signal when the charger is not operating in the phase control mode.

The fourth current command generator may further comprise a fourth current command signal output for providing the fourth current command signal to the selector.

The current command signal generator may comprise a fifth current command signal generator for generating a fifth current command signal (CCS5).

The fifth current command signal generator may comprise a low AC voltage derating signal input for receiving a low AC voltage derating signal ($V_{LOWACDERATE}$), an AC rms voltage signal input for receiving an AC rms voltage signal ($V_{ACRMS}$) representing input AC rms voltage, a maximum charger current signal input for receiving a maximum charger current signal ($I_{CHARGERMAX}$) representing maximum charger current and a low AC voltage derating range signal input for receiving a low AC voltage derating range signal ($V_{LOWACDERATERANGE}$).

The fifth current command signal generator further comprises a computation device connected to the low AC voltage derating signal input, the AC rms voltage signal input, the maximum charger current signal input and the low AC voltage derating range signal input, for producing the fifth current command signal (CCS5) according to the relation:

$$CCS5 = \frac{((V_{LOWACDERATE}) - (V_{ACRMS}))(I_{CHARGERMAX})}{V_{LOWACDERATERANGE}}$$

The fifth current command signal generator further comprises a fifth current command signal output for providing the fifth current command signal (CCS5) to the selector.

The selector may comprise a store for storing at least one of the plurality of current command signals.

The selector may comprise a comparator for performing a plurality of comparisons, for successively comparing the contents of the store with a compared signal. The compared signal is one of the current command signals other than the one of the plurality of current command signals stored in the store. After each comparison, where the compared signal is less than the contents of the store, the contents of the store are replaced with a value representing the compared signal. Where the compared signal is not less than the contents of the store, the contents of the store are left as they were before the comparison.

The selector may comprise a signal generator for producing the lowest current command signal in response to the contents of the store after performing the plurality of comparisons.

The duty cycle signal generator comprise a power command generator for generating a power command in response to the lowest current command signal and the battery current signal received at the battery current signal input.

The duty cycle signal generator may further comprise an AC current command signal generator for producing an AC current command signal in response to the power command signal and the AC voltage waveform signal received at the AC voltage waveform input.

The duty cycle signal generator may comprise a duty cycle error signal generator for generating a duty cycle error signal in response to the AC current command signal and the AC current waveform signal received at the AC current waveform input.

The duty cycle signal generator may comprise a reference duty cycle generator for producing a reference duty cycle signal. The reference duty cycle generator may comprise an AC voltage signal input for receiving an AC input voltage signal representing AC input voltage ($V_{AC}$) to the charger, a battery voltage signal input for receiving the battery voltage signal representing battery voltage ($V_{BATT}$), and a turns ratio input for receiving a signal representing a turns ratio (N) of a transformer of the charger.

The duty cycle generator further includes a computing function for producing the reference duty cycle signal according to the relation:

$$Ref\ Duty\ Cycle = \frac{V_{AC}}{NV_{BATT}}$$

The duty cycle signal generator may comprise an adder for adding the reference duty cycle signal and the duty cycle error signal to produce the duty cycle signal.

The duty cycle signal generator may comprise a clamp for bounding the duty cycle signal.

The signal inputs to the duty cycle controller apparatus may include a plurality of inputs for receiving signals representing measured quantities, a plurality of inputs for receiving user-supplied variables and a plurality of inputs for receiving a plurality of fixed values.

The plurality of inputs for receiving measured variables may include inputs for receiving signals representing input AC voltage, input AC current, temperature of charger, charger mode, phase control mode, and load current.

The plurality of inputs for receiving user supplied variables may include a plurality of inputs for receiving signals representing battery type, battery size and breaker rating of a breaker through which AC current is supplied to the battery charger.

The plurality of inputs for receiving fixed values includes inputs for receiving signals representing maximum allowable temperature of the charger, a derating range over which current output of the charger is derated due to temperature, a temperature ratio clamping value specifying a temperature ratio that cannot be exceeded, a breaker derating value representing a factor for derating a breaker through which AC current for the charger is supplied, an efficiency value representing the efficiency of the charger, a number representing the number of turns on a high voltage side of a transformer of the charger, a number representing the number of turns on a low voltage side of the transformer of the charger, a voltage value representing a low AC voltage value below which output current of the charger is to be derated, a voltage range value representing a range of AC input voltages for which the output current of the charger should be derated and a maximum charger current.

In accordance with another aspect of the invention, there is provided a battery charger comprising the duty cycle controller above and further comprising a gate drive controller operable to receive the duty cycle signal and operable to produce at least one gate drive signal in response to the duty cycle signal and a switching circuit for switching current to a battery being charged by the battery charger, the switching circuit being controlled by the at least one gate drive signal.

In accordance with another aspect of the invention, there is provided an apparatus for producing a duty cycle signal for controlling switching of switches of a battery charger having an AC input for receiving power and an output for supplying power to charge a battery in response to switching of the switches, while maintaining a high power factor at the AC input. The apparatus includes provisions for receiving a plurality of signals representing a plurality of operating conditions of the charger, the signals including a battery voltage signal ($V_{BATT}$), a battery current signal ($I_{BATT}$), an AC voltage waveform signal ($V_{AC}$) and an AC current waveform signal ($I_{AC}$). The apparatus further includes provisions for generating a plurality of current command signals in response to respective sets of operating conditions, provisions for selecting a current command signal having the lowest value to produce a lowest current command signal and provisions for producing the duty cycle signal in response to the lowest current command signal, the battery voltage signal, the battery current signal, the AC voltage waveform signal and an AC current waveform signal.

The provisions for generating a plurality of current command signals may comprise provisions for generating a first current command signal.

The provisions for generating the first current command signal may comprise provisions for receiving a battery type signal and a charger mode signal respectively, provisions for receiving the battery voltage signal ($V_{BATT}$), provisions for generating a battery voltage command signal in response to the battery type signal and the charger mode signal and provisions for producing the first current command signal in response to a difference between the battery voltage command signal and the battery voltage signal.

The provisions for generating the first current command signal may comprise provisions for producing the battery type signal in response to user input identifying battery type.

The provisions for generating a plurality of current command signals may comprise provisions for generating a second current command signal.

The provisions for generating the second current command signal may comprise provisions for receiving a temperature signal representing temperature of the charger, provisions for receiving a maximum temperature signal representing maximum temperature of the charger, provisions for receiving a derating temperature range signal specifying a range of temperature over which charging current must be reduced to avoid overheating the charger, provisions for receiving a maximum battery current signal representing maximum battery current to be applied to the battery and provisions for receiving a battery type signal and a charger mode signal respectively.

The provisions for generating the second current command signal may further include provisions for generating a temperature ratio of a difference between the maximum temperature signal and the temperature signal, to the temperature derating range signal and provisions for multiplying the maximum battery charge current signal by the temperature ratio to produce the second current command signal.

The provisions for generating the second current signal further may comprise provisions for clamping the temperature ratio to an upper bound.

The provisions for generating the second current command signal further may comprise provisions for low pass filtering the temperature signal prior to supplying the temperature signal to the provisions for generating the temperature ratio.

The provisions for generating the plurality of current command signals may comprise provisions for generating a third current command signal.

The provisions for generating the third current command signal generator may comprise provisions for receiving an efficiency signal (E) representing efficiency of the charger, provisions for receiving an AC rms signal ($V_{ACRMS}$) representing input AC rms voltage to the charger, provisions for receiving a breaker derating signal (B) representing a derating factor for derating a rated current of a breaker through which current is supplied to the charger, provisions for receiving a breaker rating current signal ($I_{BREAKERRATING}$) representing a rated current of the breaker through which current is supplied to the charger, provisions for receiving a load current signal ($I_{LOAD}$) representing load current supplied to a load connected to the same breaker through which current is supplied to the charger and provisions for receiving the battery voltage signal ($V_{BATT}$).

The provisions for generating the third current command signal may further include provisions for producing the third current command signal (CCS3) according to the relation:

$$CCS3 = \frac{(E)(V_{ACRMS})((B)(I_{BREAKER}) - (I_{LOAD}))}{V_{BATT}}$$

The provisions for generating the third current command signal may comprise provisions for producing the breaker rating current signal in response to user input.

The provisions for generating the third current command signal may comprise provisions for producing the breaker derating signal in response to user input.

The provisions for generating the plurality of current command signals may comprise provisions for generating a fourth current command signal.

The provisions for generating the fourth current command signal may comprise provisions for receiving a phase control mode signal indicating whether or not the charger is operating in a phase control mode, provisions for receiving the battery voltage signal ($V_{BATT}$), provisions for receiving a signal representing the number of high side turns of wire on a high voltage side of a transformer of the charger, provisions for receiving a signal representing the number of low side turns of wire on a low voltage side of the transformer, provisions for receiving an AC rms signal ($V_{ACRMS}$) representing input AC rms voltage to the charger and provisions for receiving a maximum charger current signal representing maximum charger current.

The provisions for generating the fourth current command signal may include provisions for producing the fourth current command signal (CCS4) according to the relation below when the phase mode signal indicates the charger is operating in a phase control mode:

$$CCS4 = \frac{(V_{BATT})(N_H)^*(I_{CHARGERMAX})}{(N_L)(V_{ACRMS})*2\sqrt{2}}$$

The provisions for generating the fourth current command signal may further include provisions for causing the fourth current command signal (CCS4) to be equal to the maximum battery current signal when the charger is not operating in the phase control mode.

The provisions for generating the plurality of current command signals may comprise provisions for generating a fifth current command signal.

The provisions for generating the fifth current command signal may comprise provisions for receiving a low AC voltage derating signal ($V_{LOWACDERATE}$), provisions for receiving an AC rms signal ($V_{ACRMS}$) representing input AC rms voltage to the charger, provisions for receiving a maximum charger current signal ($I_{CHARGERMAX}$) representing maximum charger current to be applied to the battery and provisions for receiving a low AC voltage derating range signal ($V_{LOWACDERATERANGE}$).

The provisions for producing the fifth current command signal may include provisions for producing the fifth current command signal (CCS5) according to the relation:

$$CCS5 = \frac{((V_{LOWACDERATE}) - (V_{ACRMS}))(I_{CHARGERMAX})}{V_{LOWACDERATERANGE}}$$

The apparatus may further comprise provisions for storing at least one of the plurality of current command signals.

The provisions for selecting may comprise provisions for performing a plurality of comparisons, for successively comparing the contents of the store with a compared signal. The compared signal may be one of the current command signals other than the one stored in the store. After each comparison, where the compared signal is less than the contents of the store, the contents of the store are replaced with a value representing the compared signal and where the compared signal is not less than the contents of the store, the contents of the store are left as they were before the comparison.

The provisions for selecting may comprise provisions for producing the lowest current command signal in response to the contents of the store after performing the plurality of comparisons.

The provisions for producing the duty cycle signal may comprise provisions for generating a power command in response to the lowest current command signal and the battery current signal.

The provisions for producing the duty cycle signal further may comprise provisions for producing an AC current command signal in response to the power command signal and the AC voltage waveform signal.

The provisions for producing the duty cycle signal may comprise provisions for generating a duty cycle error signal in response to the AC current command signal and the AC current waveform signal.

The provisions for producing the duty cycle signal may comprise provisions for receiving a signal representing a turns ratio (N) of a transformer of the charger and provisions for producing a reference duty cycle signal according to the relation:

$$\text{Ref Duty Cycle} = \frac{V_{AC}}{NV_{BATT}}$$

The provisions for producing the duty cycle signal may comprise generating the duty cycle signal in response to the reference duty cycle signal and the duty cycle error signal.

The provisions for producing the duty cycle signal may comprise bounding the duty cycle signal.

In accordance with another aspect of the invention, there is provided a method of producing a duty cycle signal for controlling switching of switches of a battery charger having an AC input for receiving power and a charge output for supplying power to charge a battery in response to switching of the switches, while maintaining a high power factor at the AC input. The method involves receiving a plurality of signals representing a plurality of operating conditions of the charger, the signals including a battery voltage signal ($V_{BATT}$), a battery current signal ($I_{BATT}$), an AC voltage waveform signal ($V_{AC}$) and an AC current waveform signal ($I_{AC}$). The method further involves generating a plurality of current command signals in response to respective sets of operating conditions.

The method further involves selecting a current command signal having the lowest value to produce a lowest current command signal and producing the duty cycle signal in response to the lowest current command signal, the battery voltage signal, the battery charge current signal, the AC voltage signal and the AC current waveform signal.

Generating a plurality of current command signals may involve generating a first current command signal.

Generating the first current command signal may involve receiving a battery type signal and a charger mode signal respectively, generating a battery voltage command signal in response to the battery type signal and the charger mode signal and producing the first current command signal in response to a difference between the battery voltage command signal and the battery voltage signal.

Generating the first current command signal may involve producing the battery type signal in response to user input identifying battery type.

Generating the plurality of current command signals may further involve generating a second current command signal.

Generating the second current command signal may further involve receiving a temperature signal representing temperature of the charger, receiving a maximum temperature signal representing maximum temperature of the charger, receiving a derating temperature range signal specifying a range of temperature over which charging current must be reduced to avoid overheating the charger and receiving a maximum charger current signal representing maximum charger current.

The method may further involve generating a temperature ratio of a difference between the maximum temperature signal and the temperature signal, to the temperature derate range signal, and multiplying the maximum battery charge current signal by the temperature ratio to produce the second current command signal.

The method may further involve clamping the temperature ratio to an upper bound.

The method may further involve low pass filtering the temperature signal prior to supplying the temperature signal to the temperature ratio generator.

Generating the plurality of current command signals may involve generating a third current command signal.

Generating the third current command signal generator may involve receiving an efficiency signal (E) representing efficiency of the charger, receiving an AC rms signal ($V_{ACRMS}$) representing input AC rms voltage to the charger and receiving a breaker derating signal (B) representing a derating factor for derating a rated current of a breaker through which current is supplied to the charger.

The method may further involve receiving a breaker rating current signal ($I_{BREAKERRATING}$) representing a rated current of the breaker through which current is supplied to the charger and receiving a load current signal ($I_{LOAD}$) representing load current supplied to a load connected to the same breaker through which current is supplied to the charger.

The method may further involve producing the third current command signal (CCS3) according to the relation:

$$CCS3 = \frac{(E)(V_{ACRMS})((B)(I_{BREAKER}) - (I_{LOAD}))}{V_{BATT}}$$

Generating the third current command signal may involve producing the breaker rating current signal in response to user input.

Generating the third current command signal generator may involve producing the breaker derating signal in response to user input.

Generating the plurality of current command signals may comprise generating a fourth current command signal.

Generating the fourth current command may involve receiving a phase control mode signal indicating whether or not the charger is operating in a phase control mode, receiving a signal representing the number of high side turns of wire on a high voltage side of a transformer of the charger and receiving a signal representing the number of low side turns of wire on a low voltage side of the transformer.

The method may involve receiving an AC rms signal ($V_{ACRMS}$) representing input AC rms voltage to the charger and receiving a maximum charger current signal ($I_{CHARGERMAX}$) representing maximum charger current to be applied to the battery.

The method may further involve producing the fourth current command signal (CCS4) according to the relation below when the phase mode signal indicates the charger is operating in a phase control mode:

$$CCS4 = \frac{(V_{BATT})(N_H)*(I_{CHARGERMAX})}{(N_L)(V_{ACRMS})*2\sqrt{2}}$$

The method may further involve causing the fourth current command signal (CCS4) to be equal to the maximum battery current signal when the charger is not operating in the phase control mode.

Generating the plurality of current command signals may involve generating a fifth current command signal.

Generating the fifth current command signal may involve receiving a low AC voltage derating signal ($V_{LOWACDERATE}$), receiving an AC rms signal ($V_{ACRMS}$) representing input AC rms voltage to the charger, receiving a maximum charger current signal ($I_{CHARGERMAX}$) representing maximum charger current to be applied to the battery and receiving a low AC voltage derating range signal ($V_{LOWACDERATERANGE}$);

The method may further involve producing the fifth current command signal (CCS5) according to the relation:

$$CCS5 = \frac{((V_{LOWACDERATE}) - (V_{ACRMS}))(I_{CHARGERMAX})}{V_{LOWACDERATERANGE}}$$

The method may further involve storing at least one of the plurality of current command signals.

Selecting may involve performing a plurality of comparisons, for successively comparing the contents of the store with a compared signal, the compared signal being the current command signal other than one of the plurality of current command signals that is stored in the store. After each comparison, where the compared signal is less than the contents of the store. The method may involve replacing the contents of the store with a value representing the compared signal and where the compared signal is not less than the contents of the store, leaving the contents of the store as they were before the comparison.

Selecting may involve producing the lowest current command signal in response to the contents of the store, after performing the plurality of comparisons.

Producing the duty cycle signal may involve generating a power command in response to the lowest current command signal and the battery current signal.

Producing the duty cycle signal may further involve producing an AC current command signal in response to the power command signal and the AC voltage waveform signal.

Producing the duty cycle signal may involve generating a duty cycle error signal in response to the AC current command signal and the AC current waveform signal.

Producing the duty cycle signal may involve producing a reference duty cycle signal by receiving a signal representing a turns ratio (N) of a transformer of the charger and producing the reference duty cycle signal according to the relation:

$$\text{Ref Duty Cycle} = \frac{V_{AC}}{N \, V_{BATT}}$$

Producing the duty cycle may involve generating the duty cycle signal in response to the reference duty cycle signal and the duty cycle error signal.

Producing the duty cycle may comprise bounding the duty cycle signal.

In accordance with another aspect of the invention, there is provided a computer readable medium encoded with codes for directing a processor circuit to carry out the method and any of its variations above.

In accordance with another aspect of the invention, there is provided a computer readable signal encoded with codes for directing a processor circuit to carry out the method and any of its variations above.

In general the invention permits various sets of operating conditions of the charger to be used to establish a plurality of current command signals, the lowest of which is used to finally control the duty cycle of switches in the charger to prevent inappropriate conditions being experienced or caused by the charger.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
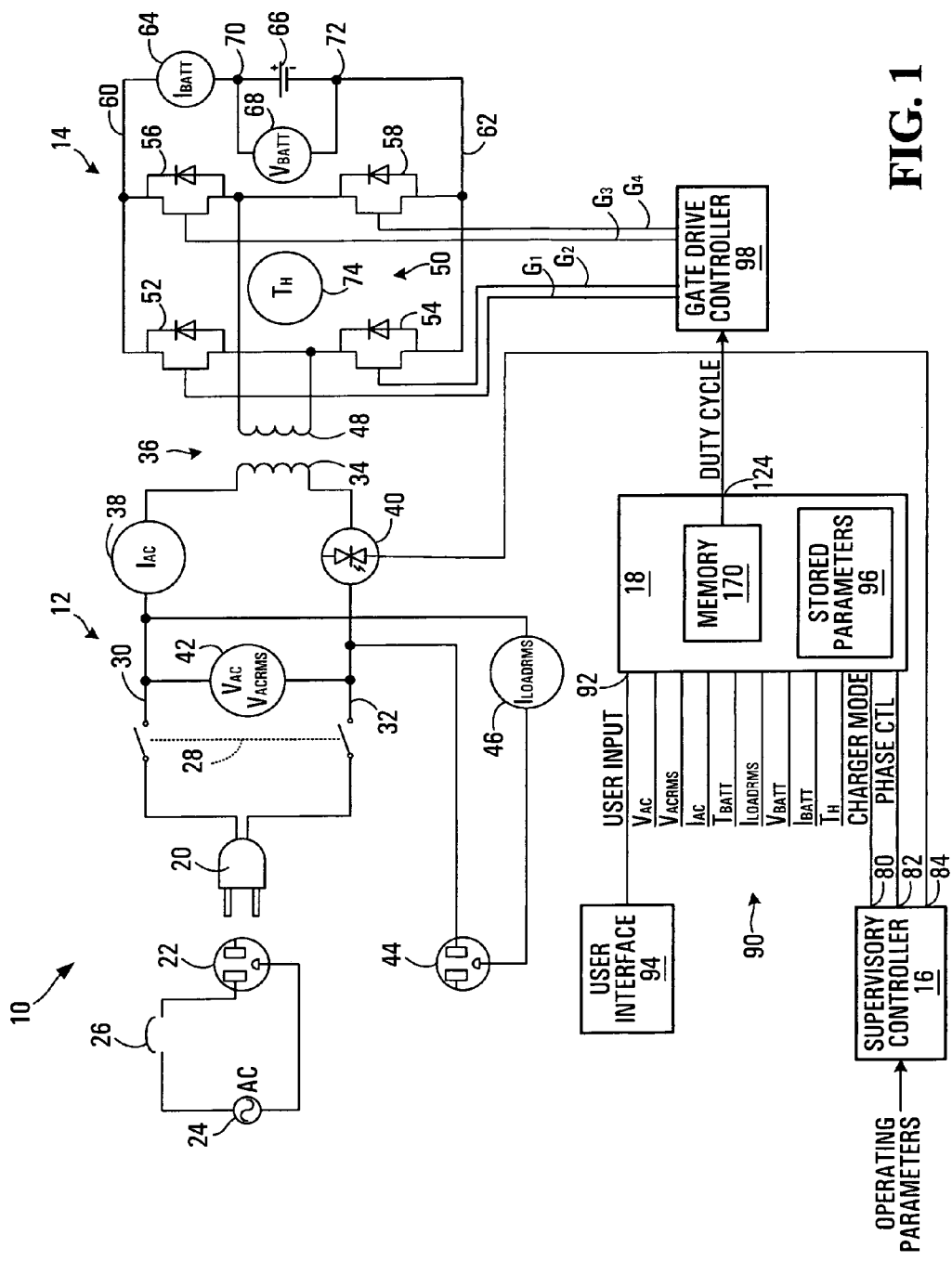
FIG. 1 is a block diagram of a battery charger according to a first embodiment of the invention.

Referring to FIG. 1, a battery charger according to a first embodiment of the invention is shown generally at 10. The battery charger 10 includes a high voltage circuit shown generally at 12, a low voltage circuit shown generally at 14, a supervisory controller 16, a duty cycle controller 18, a user interface 94 and a gate drive controller 98.

The high voltage circuit 12 includes an AC plug 20 for receiving power from a receptacle 22 connected to an AC power source 24 through a breaker 26. The breaker 26 may be rated for 15 Amps, for example. The high voltage circuit 12 further includes an on/off switch 28 and line and neutral input terminals 30 and 32, respectively. The line and neutral input terminals 30 and 32 are connected to a high voltage winding 34 of a transformer 36 coupling the high and low voltage circuits 12 and 14 together. The input line terminal 30 is connected to the high voltage winding 34 of the transformer through a current sensor 38 or a plurality of current sensors operable to produce an AC input current waveform signal ($I_{AC}$). In this embodiment, the neutral terminal 32 is connected to the high voltage winding 34 of the transformer 36 through a triac 40 controlled by the supervisory controller 16. An input voltage sensor shown generally at 42 is connected between the line and neutral terminals 30 and 32 and is operable to produce an input AC voltage waveform signal ($V_{AC}$) and an input AC rms voltage waveform signal ($V_{ACRMS}$). Also connected to the input line and neutral terminals 30 and 32 is a second receptacle 44 and a load current sensor 46 for sensing load current drawn through the receptacle 44 from the high voltage circuit 12 to power any AC device that may be connected to the receptacle. The load current sensor 46 is operable to produce a load current signal ($I_{LOADRMS}$) indicating load current supplied to the AC device.

The low voltage circuit 14 includes a low voltage winding 48 of the transformer 36 connected to a switching network 50 of transistors 52, 54, 56 and 58 connected in a full wave bridge topology to provide a positive DC voltage terminal 60 and a negative DC voltage terminal 62. The positive terminal 60 includes a battery current sensor 64 for producing a battery current signal ($I_{BATT}$) representing current supplied to a battery 66 connected between the positive and negative terminals 60 and 62. A battery voltage sensor 68 is connected across first and second battery connections 70 and 72 to which the battery 66 is connected, to measure battery voltage. The battery voltage sensor 68 thus produces a battery voltage signal ($V_{BATT}$) representing battery voltage.

The transistors 52, 54, 56 and 58 are connected to a heat sink (not shown) to which is connected a temperature sensor 74 in thermal communication therewith for producing a charger temperature signal representing temperature of the heat sink and more generally, temperature of the charger.

The supervisory controller 16 is operable to receive signals from any of the sensors 38, 42, 46, 64, 68 and 74, and possibly other sensors measuring operating parameters of the charger. The supervisory controller 16 is conventional and generally ensures that common operating conditions of the charger are kept within limits, as is common in the art. Of importance, however, in this embodiment, the supervisory controller 16 has an output 80 for producing a charger mode signal indicating the charger mode in which the charger is operating. The charger mode may include bulk, absorption, equalize and float modes, for example. Alternatively, a state of charge signal representing state of charge of the battery 66 may be employed.

The supervisory controller 16 further has a phase control signal output 82 for producing a signal indicating whether or not the charger is operating in a phase control mode. The supervisory controller 16 also has an output 84 for providing a triac control signal for controlling firing of the triac 40 to keep the peak AC voltage across the high voltage winding 34 of the transformer 36 within limits. This avoids a reflected voltage in the low voltage winding 48 of the transformer, of a magnitude that would cause the transistors 52, 54, 56 and 58 to be short circuited as a result of the net voltage applied thereto as a result of the combination of the voltage across the low voltage winding 48 and the voltage provided by the battery 66.

The duty cycle controller 18 has a plurality of inputs shown generally at 90 for receiving signals representing measured quantities including those produced by the current sensor 38, voltage sensor 42, load sensor 46, battery current sensor 64, battery voltage sensor 68 and temperature sensor 74.

Figure 10:
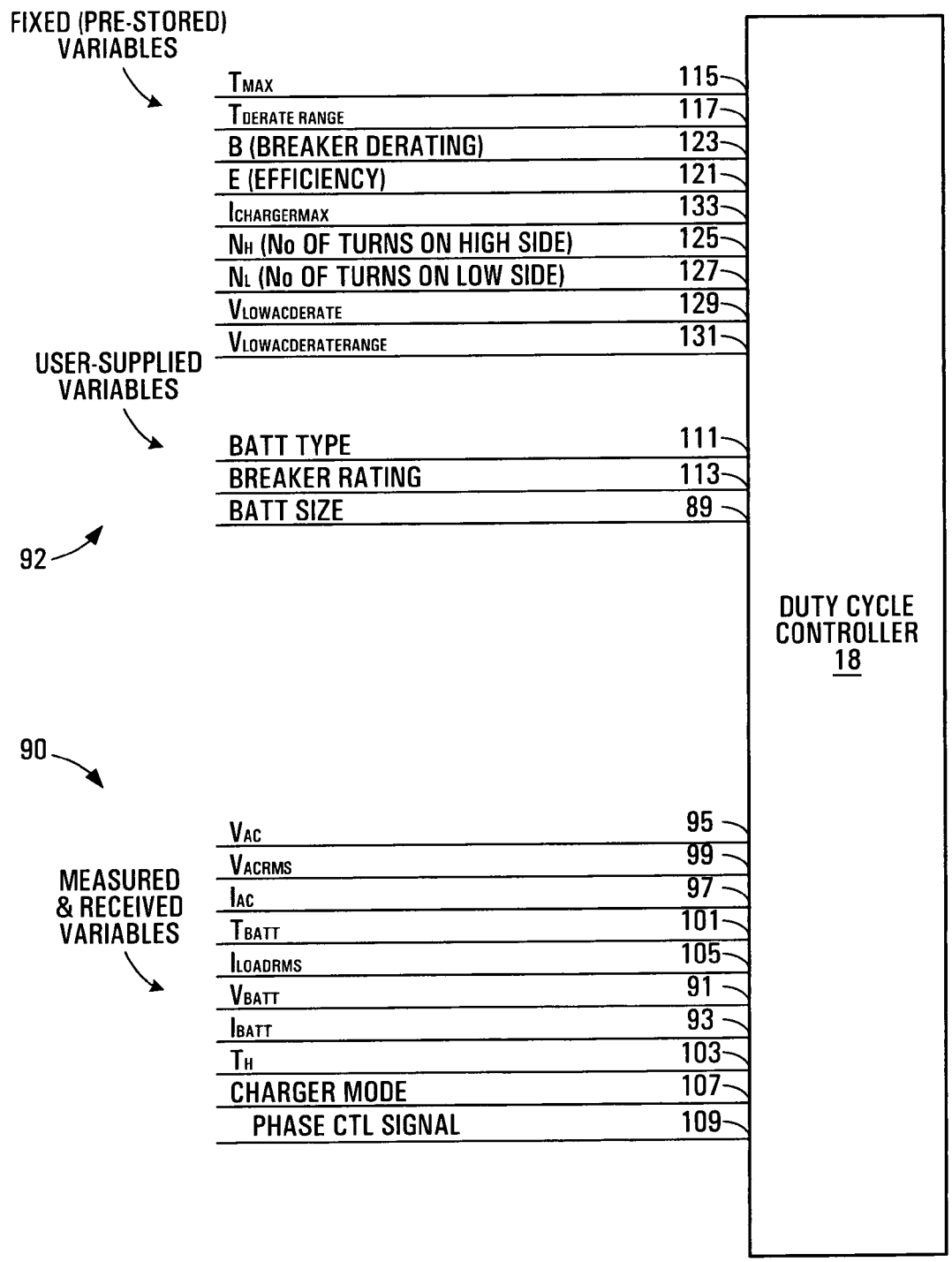
FIG. 10 is a schematic representation of a plurality of inputs to the duty cycle controller apparatus shown in FIG. 2.

In particular, referring to FIG. 10, inputs 90 include a battery voltage signal input 91 for receiving the battery voltage signal ($V_{BATT}$), a battery current signal input 93 for receiving the battery current signal ($I_{BATT}$), an AC voltage waveform signal input 95 for receiving the AC voltage waveform signal ($V_{AC}$), an AC current waveform signal input 97 for receiving the AC current waveform signal ($I_{AC}$), an AC rms voltage signal input 99 for receiving the AC rms voltage signal ($V_{ACRMS}$) representing input AC rms voltage, a load current signal input 105 for receiving the load current signal ($I_{LOADRMS}$) representing load current supplied to a load connected to the same breaker (26) through which current is supplied to the charger, a temperature signal input 103 for receiving a temperature signal ($T_H$) representing temperature of the charger, a charger mode signal input 107 for receiving a charger mode signal representing the charger mode of the charger, a phase control mode signal input 109 for receiving the phase control mode signal indicating whether or not said charger is operating in a phase control mode and may include a battery temperature signal input 101 for receiving a battery temperature signal $T_{BATT}$ representing the temperature of the battery (66).

The duty cycle controller 18 further includes a plurality of user inputs 92 for receiving user-supplied signals including a battery type signal input 111 for receiving a battery type signal indicative of the type of battery being charged. Alternatively, the battery type signal may be fixed so that the charger is only useable with a specified type of battery. This signal may indicate the battery is a wet lead acid type, or a gel cell, for example.

The plurality of user inputs 92 further includes a breaker current signal input 113 for receiving a breaker rating current signal ($I_{BREAKER\ RATING}$) representing a rated current of the breaker rating through which current is supplied to the charger.

The plurality of user inputs 92 further includes a battery size input 89 for receiving a battery size signal indicative of the size of the battery being charged, in Amp-hours, for example. Alternatively, the battery size signal may be provided by a pre-stored or hard-coded value, where the charger is only intended for use with batteries of a particular size.

The plurality of inputs 92 may further include a plurality of inputs for receiving from the user interface 94 signals representing fixed parameters, representing various other operating parameters of the charger and conditions under which it operates. Generally these parameters may be entered using the user interface 94 and corresponding signals are produced and stored in a stored parameters memory shown generally at 96. The user interface 94 may present prompts to the user to prompt for entry of these parameters. The user interface 94 may act to produce signals in response to user input for receipt at the following inputs of the duty cycle controller: a maximum temperature signal input 115 for receiving a maximum temperature signal ($T_{MAX}$) representing maximum temperature of the charger, a derating range signal input 117 for receiving a derating temperature range signal ($T_{DERATERANGE}$) specifying a range of temperature over which charging current must be reduced to avoid overheating the charger, an efficiency signal input 121 for receiving an efficiency signal (E) representing efficiency of the charger, a breaker derating signal input 123 for receiving a breaker derating signal (B) representing a derating factor for derating a rated current of a breaker through which AC current is supplied to said charger, a high side turns signal input 125 for receiving a signal ($N_H$) representing the number of high side turns of wire on a high voltage side of a transformer of the charger, a low side turns signal input 127 for receiving a signal ($N_L$) representing the number of low side turns of wire on a low voltage side of the transformer, a low AC voltage derating signal input 129 for receiving a low AC voltage derating signal ($V_{LOWACDERATE}$), and a low AC voltage derating range signal input 131 for receiving a low AC voltage derating range signal ($V_{LOWACDERATERANGE}$), and a maximum charger current signal input 133 for receiving a maximum charger current signal ($I_{CHARGERMAX}$) representing the maximum charger current available from the charger. Some of these signals may be factory set rather than input by a user.

Referring back to FIG. 1, in response to signals received at the measured value inputs 90, the user inputs 92 and in response to the stored parameters 96, the duty cycle controller produces a duty cycle signal for receipt by the gate drive controller 98 which, in response to the duty cycle signal, produces gate drive signals G1, G2, G3 and G4 for controlling respective transistors 52, 54, 56, and 58 of the switching network 50 to ultimately control the amount of current supplied to the battery 66 to control the voltage across the battery while, at the same time, maintaining a high power factor in power drawn at the line and neutral terminals 30 and 32 of the high voltage circuit 12 of the charger.

It will be appreciated that the supervisory controller 16, the duty cycle controller 18, the user interface 94 and the gate drive controller 98 may be embodied in a microprocessor or digital signal processor, for example, or a combination of a microprocessor and/or digital signal processor and/or discrete hardware elements. For example, the gate drive controller 98 may be conveniently implemented by logic gates, the supervisory controller 16 and user interface 94 may be implemented by a common microprocessor and the duty cycle controller may be implemented in a digital signal processor. It will be appreciated that in any microprocessor implementation, the microprocessor may include a processor in communication with a computer-readable medium encoded with codes for directing the processor to carry out the methods described herein and/or variations thereof.

Figure 2:
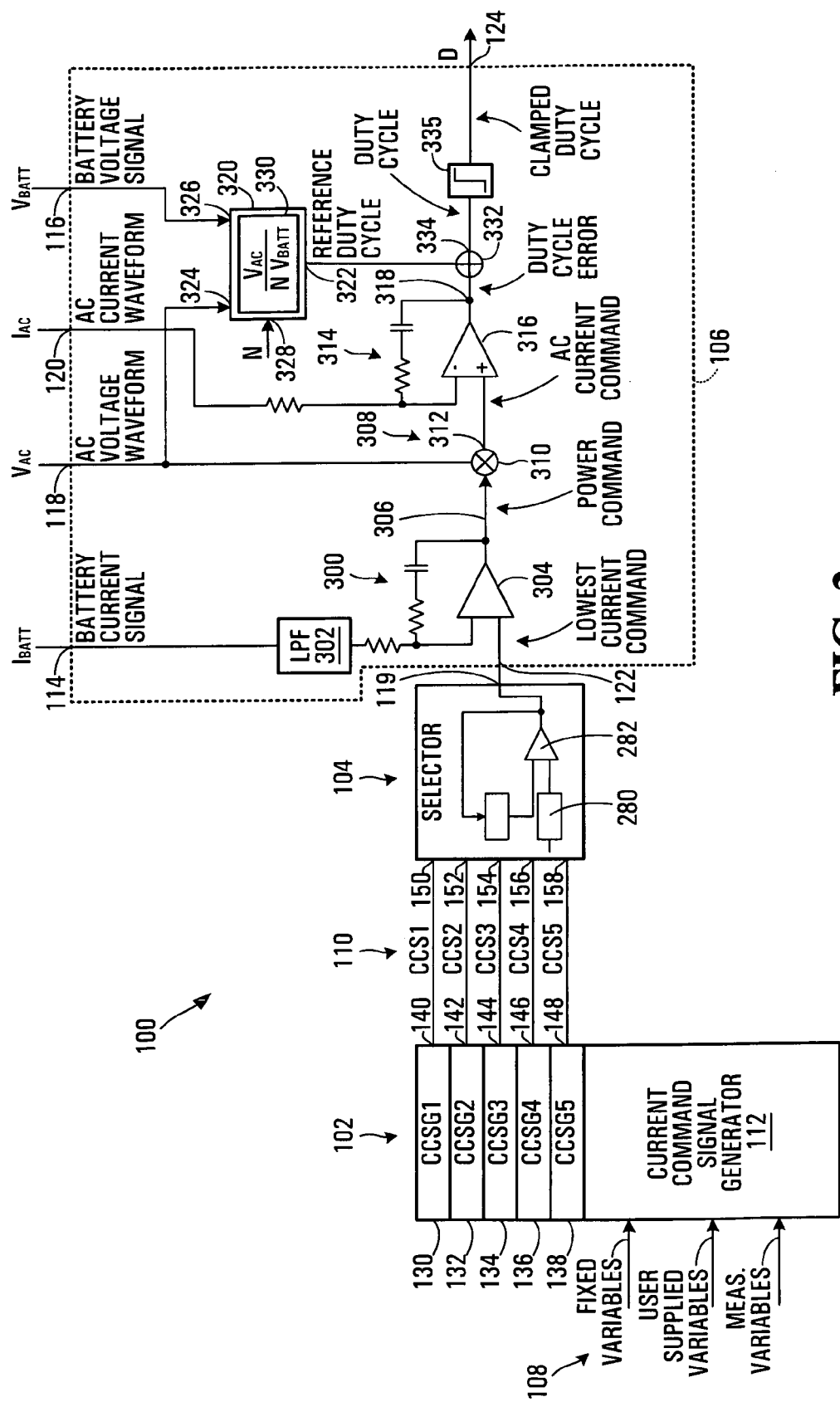
FIG. 2 is a block diagram of a duty cycle controller apparatus of the battery charger shown in FIG. 1.

Referring to FIG. 2, the duty cycle controller apparatus is shown in greater detail at 100. In general, the duty cycle controller apparatus 100 includes a current command signal generator shown generally at 102, a selector shown generally at 104, and a duty cycle signal generator shown in broken outline at 106. The current command signal generator 102 has a plurality of signal inputs 108 for receiving a plurality of signals representing a plurality of operating conditions of the charger, this plurality of inputs 108 being in communication with inputs 90 and 92 shown in FIG. 10. It also has a plurality of current command outputs shown generally at 110 and includes a processor 112 operably configured to generate a plurality of current command signals at the current command outputs 110 in response to respective sets of operating conditions represented by the signals received at the plurality of signal inputs 108.

The selector 104 is configured to receive the plurality of current command signals and to select a current command signal having a lowest value and to produce a lowest current command signal in response thereto.

The duty cycle signal generator 106 has a battery current signal input 114, a battery voltage signal input 116, an AC voltage waveform input 118, an AC current waveform input 120 in communication with the general inputs to the duty cycle controller, by the same names (93, 91, 95, 97 in FIG. 10) and further includes, a lowest current command input 122 and a duty cycle signal output 124. The duty cycle signal generator 106 is configured to produce the duty cycle signal at the duty cycle signal output 124 in response to the lowest current command signal, the battery current signal, the battery voltage signal, the AC voltage waveform signal and the AC current waveform signal received at inputs by the same names 122, 114, 116, 118, and 120, respectively.

In the embodiment shown, the current command signal generator includes first, second, third, fourth and fifth current command signal generators 130, 132, 134, 136 and 138, operable to produce first, second, third, fourth and fifth current command signals at first, second, third, fourth and fifth current command signal outputs 140, 142, 144, 146 and 148, respectively. The current command signal outputs 140, 142, 144, 146 and 148 are connected to respective current command signal inputs 150, 152, 154, 156 and 158, respectively, of the selector 104.

It will be appreciated that the duty cycle controller shown in FIG. 2 may desirably be implemented in a digital signal processor capable of implementing a plurality of functions including the first, second, third, fourth and fifth current command signal generators 130 to 138. Consequently, the functionality of each of these generators will be described in functional terms, it being understood that the functions described may be used to specify a design structure for designing or configuring a suitable digital signal processor or programming a programmable digital signal processor for performing the functions described herein. Throughout this description references to "signals" or a "signal", may be construed as any digital or analog electrical, optical, or electromagnetic entity operable to represent information. Hence, a number stored in memory, for example, is deemed to be a "signal" or "signals", as will be appreciated by one of ordinary skill in the art.

Figure 3:
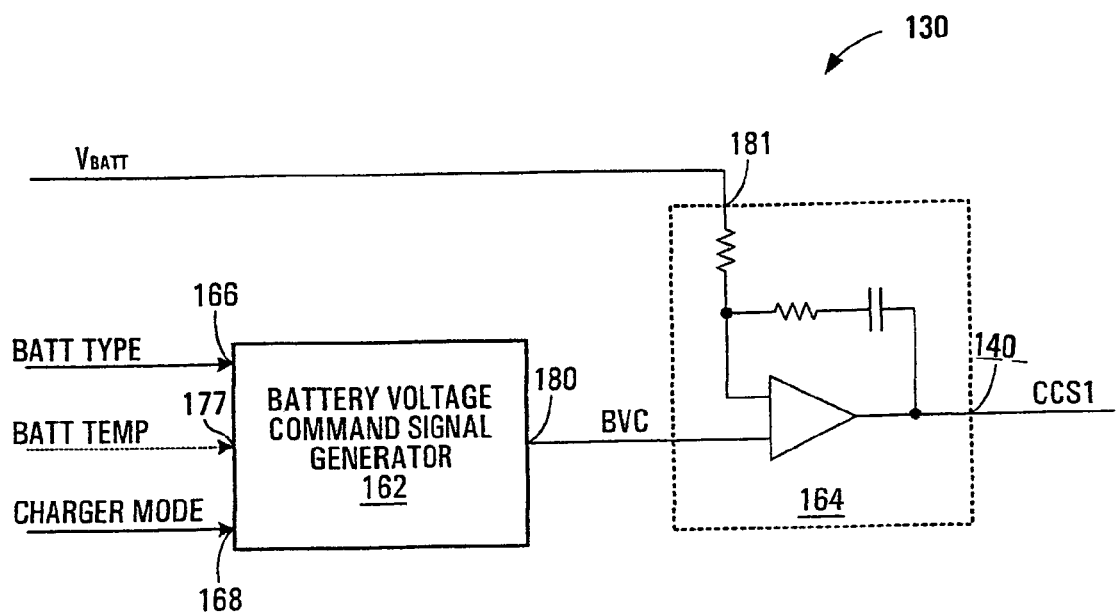
FIG. 3 is a functional representation of a first current command signal generator of the duty cycle controller apparatus shown in FIG. 2.

Referring to FIGS. 3 and 10, a functional description of the first current command signal generator is shown generally at 130 and includes a battery voltage command signal generator 162 and a difference signal generator shown generally at 164. The battery voltage command signal generator 162 has battery type and charger mode signal inputs 166 and 168 (in communication with inputs 111 and 107, respectively) for receiving the battery type signal and charger mode signal, respectively.

Figure 4:
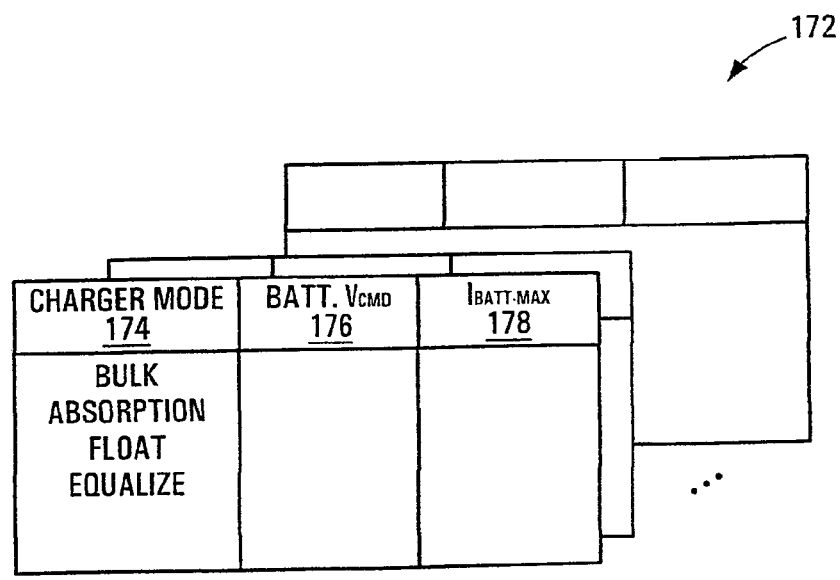
FIG. 4 is a schematic representation of a plurality of battery tables relating charger mode to a battery voltage command signal and a maximum battery current signal for respective types of batteries that may be charged by the charger shown in FIG. 1.

Referring to FIG. 4, in the embodiment shown, the memory (170) of the duty cycle controller is configured to represent a plurality of battery type tables, as shown at 172. Each battery type table associates a charger mode 174 for a given battery type with a battery voltage command value 176 and a maximum battery current value ($I_{BATTMAX}$) 178. The battery voltage command value 176 and battery current value $I_{BATTMAX}$ 178 are set by the manufacturer of the battery and generally indicate the maximum value voltage and current that may be applied to the battery in a given charger mode. Thus, referring to FIGS. 3 and 4, for a given battery type signal received at the battery type signal input 166, and for a given charger mode signal received at the charger mode signal input 168, the battery voltage command signal generator addresses the memory 170 shown in FIG. 1 to find a battery type table indicated by the battery type signal and then, within the identified table, uses the charger mode signal to find a battery voltage command value 176 associated with the charger mode represented by the charger mode signal.

Optionally, the battery voltage command signal generator 162 may have a further battery temperature signal input 177 in communication with the battery temperature signal input 101. The battery voltage command signal generator 162 may be configured to modify the battery voltage command signal produced in response to the battery type signal and the charger mode signal, in response to the battery temperature signal.

The battery voltage command value 176 is produced at a battery voltage command signal output 180 of the battery voltage command signal generator 162. The output 180 is connected to a corresponding input of the difference signal generator 164. The difference signal generator 164 further has a battery voltage signal input 181 in communication with the battery voltage input 91 for receiving the battery voltage signal. The difference signal generator is operably configured to produce the first current command signal in response to a difference between the battery voltage command signal and the battery voltage signal. The difference signal generator 164 has an output 140 which acts as a first command signal output of the first current command signal generator 160, for providing the first current command signal to the selector 104 shown in FIG. 2.

Figure 5:
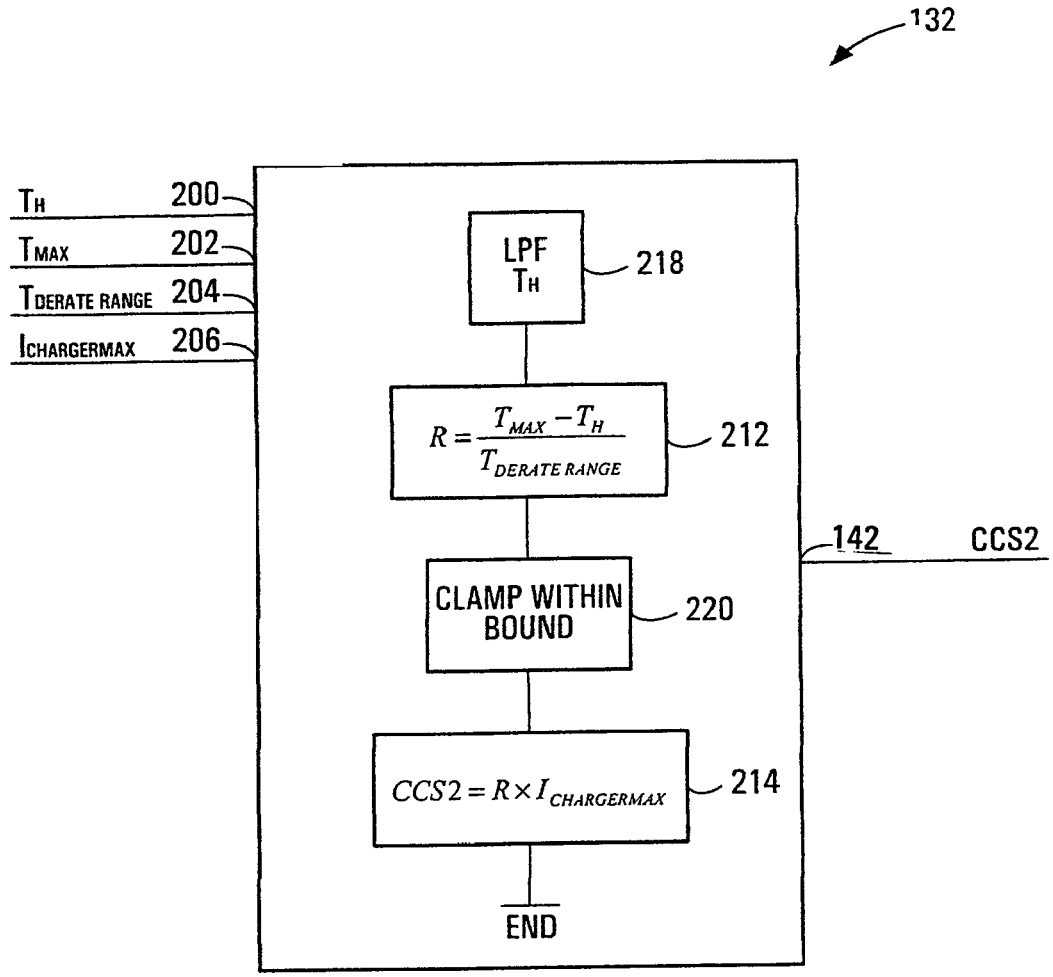
FIG. 5 is a functional representation of a second current command signal of the duty cycle controller apparatus shown in FIG. 2.

Referring to FIGS. 5 and 10, the functionality of the second current command signal generator is shown generally at 132. The second current command signal generator 132 includes a temperature signal input 200 in communication with the temperature signal input 103, for receiving the temperature signal ($T_H$) representing temperature of the charger, a maximum temperature signal input 202 in communication with the maximum temperature signal input 115 of the duty cycle controller for receiving the maximum temperature signal ($T_{MAX}$) representing maximum temperature of the charger, a derating range signal input 204 in communication with the derating range signal input 131 of the duty cycle controller for receiving the derating temperature range signal ($T_{DERATERANGE}$) specifying a range of temperature over which charging current must be reduced to avoid overheating the charger and a maximum charger current signal input 206 in communication with the maximum charger current signal input 133 for receiving the maximum charger current signal ($I_{CHARGERMAX}$) representing maximum charger current available.

The functionality of the second current command signal generator 132 includes a temperature ratio generator 212 for generating a temperature ratio of a difference between the maximum temperature signal received at the maximum temperature signal input 202 and the temperature signal received at the temperature signal input 200 to the temperature derate range indicated by the temperature derate range signal received at the temperature derating range signal input 204. In addition, the second command signal generator 132 includes a multiplier 214 for multiplying the maximum charger current signal ($I_{CHARGERMAX}$) by the temperature ratio to produce the second current command signal at an output 142 thereof. The output 142 acts as the second current command signal output of the second current command signal generator 132 for providing the second current command signal to the selector 104 shown in FIG. 2. Optionally and desirably, the second current command signal generator 132 includes a lowpass filter function 218 for lowpass filtering the temperature signal representing the temperature of the charger prior to supplying the temperature signal to the temperature ratio generator 212. The lowpass filter may have a cutoff frequency of about 1 Hz, for example. In addition, desirably, the second current command signal generator 132 includes a clamping function 220 for clamping the temperature ratio to an upper bound prior to use of the temperature ratio by the multiplier 214. In addition, a test function (not shown) may be included in the second command generator to test whether the temperature $T_H$ is greater than the derating temperature $T_{MAX}$ and to only perform the reduction from maximum charger current provided by the multiplier 214 when $T_H$ is greater than $T_{MAX}$. Otherwise, the second current command is set to the maximum charger current ($I_{CHARGERMAX}$).

Figure 6:
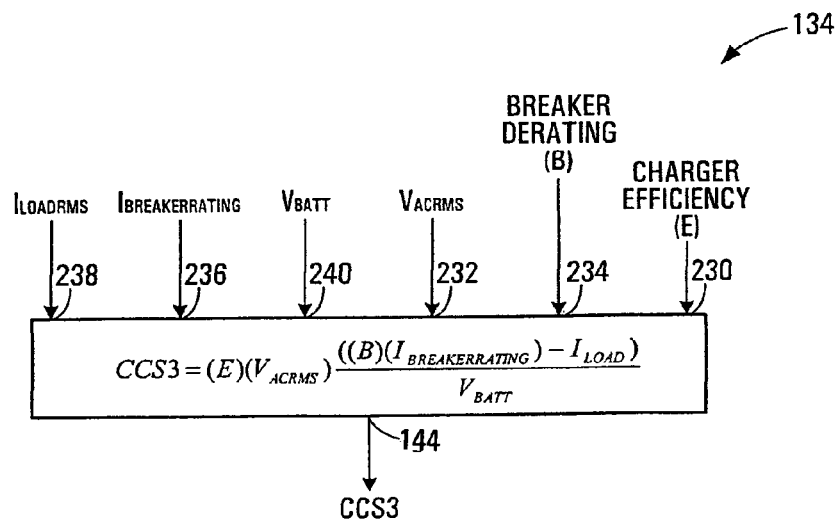
FIG. 6 is a functional representation of a third current command signal of the duty cycle controller apparatus shown in FIG. 2.

Referring to FIGS. 6 and 10, the third current command signal generator is shown generally at 134. The third current command signal generator 134 includes an efficiency signal input 230 in communication with the efficiency signal input 121, for receiving the efficiency signal representing efficiency of the charger. It also includes an AC rms voltage signal input 232 in communication with the AC rms voltage signal input 99 for receiving the AC rms voltage signal ($V_{ACRMS}$) representing input AC rms voltage. The third current command signal generator 134 shown in FIG. 6 further includes a breaker derating signal input 234 in communication with the breaker derating input 123 for receiving the breaker derating signal (B). The third current command signal generator 134 further includes a breaker rating current signal input 236 in communication with the breaker rating current signal input 113 for receiving the breaker rating current signal ($I_{BREAKERRATING}$) representing a rated current of the breaker 26 through which current is supplied to the charger. The third current command signal generator 134 further includes a load current signal input 238 in communication with the load current signal input 101, for receiving the load current signal ($I_{LOAD}$) representing load current supplied to a load connected to the same breaker through which current is supplied to the charger. The third current command signal generator 134 further includes a battery voltage signal input 240 in communication with the battery voltage signal input 91, for receiving the battery voltage signal produced by the battery voltage sensor 68 shown in FIG. 1.

The third current command signal generator further includes a computation function for producing the third current command signal CCS3 according to the relation:

$$CCS3 = \frac{(E)(V_{ACRMS})((B)(I_{BREAKER}) - (I_{LOAD}))}{V_{BATT}}$$

Alternatively, the use of the $V_{BATT}$ signal may be replaced with a constant value, especially where the third current command signal generator is implemented in a digital signal processor in which divide functions use a significant amount of processor resources.

The value (CCS3) produced by the above relation is used to provide a signal at an output 242 of the third current command signal generator 134 to provide the third current command signal to the selector 104 shown in FIG. 2.

Figure 7:
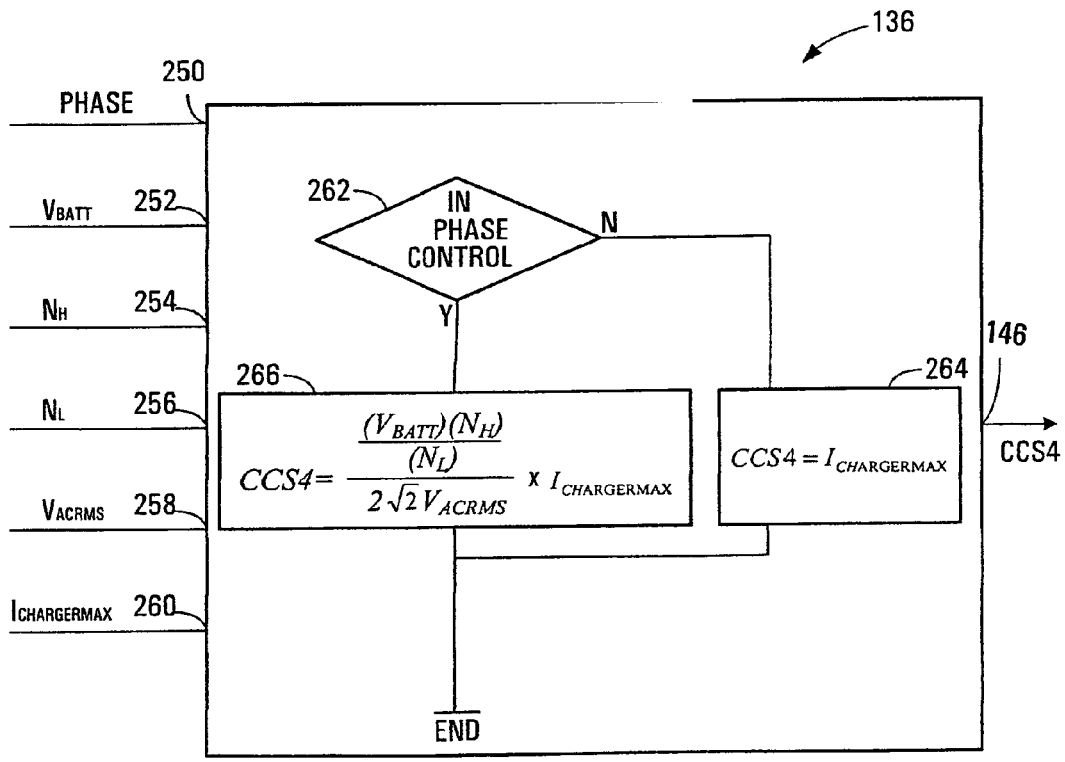
FIG. 7 is a functional representation of a fourth current command signal of the duty cycle controller apparatus shown in FIG. 2.

Referring to FIGS. 7 and 10, the functionality of the fourth current command signal generator is shown generally at 136. The fourth current command signal generator 136 includes a phase control mode signal input 250 in communication with the phase control mode signal input 109 for receiving the phase control mode signal indicating whether or not the charger is operating in a phase control mode. The fourth current control signal generator 136 further includes a battery voltage signal input 252 in communication with the battery voltage signal input 91 for receiving the battery voltage signal. The fourth current control signal generator 136 further includes high and low side turns signal inputs 254 and 256 in communication with high and low side turns signal inputs 125 and 127, respectively, for receiving the high turns signal ($N_H$) and for receiving the low turns signal ($N_L$). The fourth current command signal generator 136 further includes an AC rms voltage signal input 258 in communication with the AC rms voltage signal input 99 for receiving the AC rms signal ($V_{ACRMS}$) representing input AC rms voltage to the charger. The fourth current command signal generator 136 further includes a maximum charger current signal input 260 for receiving the maximum charger current signal $I_{CHARGERMAX}$ from the maximum charger current input 133.

The fourth current control signal generator 136 includes a test function 262 for testing whether or not the phase control mode signal received at the phase control mode signal input 250 indicates that the charger is in the phase control mode. If the charger is not in the phase control mode, a current command signal assignment function 264 causes the fourth current command signal to be equal to the maximum charger current signal $I_{CHARGERMAX}$. When the phase control mode signal indicates the charger is in the phase control mode, a computation function 266 computes the value of the fourth current command signal according to the relation:

$$CCS4 = \frac{(V_{BATT})(N_H)*(I_{CHARGERMAX})}{(N_L)(V_{ACRMS})*2\sqrt{2}}$$

The fourth current command signal, whether produced by the assignment function 264 or the computation function 266, is provided at an output 146 of the fourth current command signal generator for providing the fourth current command signal to the selector 104 shown in FIG. 2.

Figure 8:
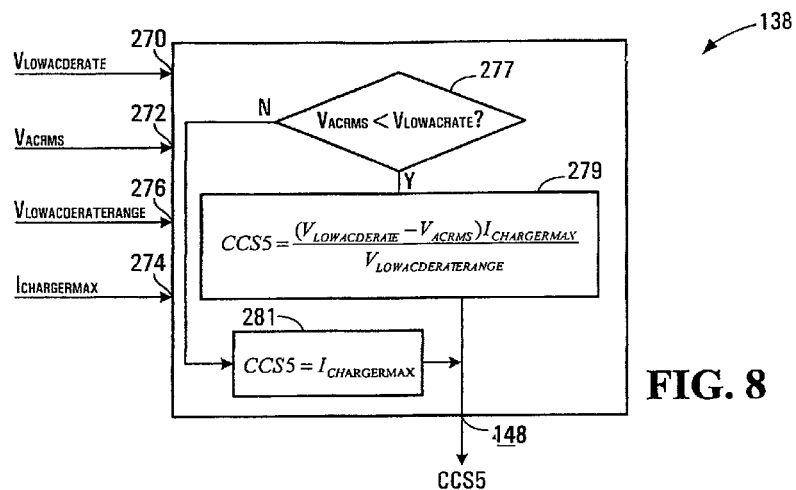
FIG. 8 is a functional representation of a fifth current command signal of the duty cycle controller apparatus shown in FIG. 2.

Referring to FIGS. 8 and 10, the fifth current command signal generator is shown generally at 138 and includes a low AC voltage derating signal input 270 in communication with the low AC voltage derating signal input 129 for receiving the low AC voltage derating signal ($V_{LOWACDERATE}$), and an AC rms voltage signal input 272 in communication with the AC rms voltage signal input 99 for receiving the AC rms voltage signal ($V_{ACRMS}$) representing input AC rms voltage. The fifth current command signal generator 138 further includes a maximum charger current signal input 274 in communication with the maximum charger current signal input 133, for receiving the maximum battery current signal ($I_{CHARGERMAX}$).

The fifth current command signal generator 138 further includes a low AC voltage derating signal input 276 in communication with the low AC derating signal input 129 for receiving the low AC voltage derating range signal ($V_{LOWACDERATERANGE}$).

The fifth current command signal generator 138 further includes a test function 277 for determining whether the AC rms voltage signal represents a voltage less than a low AC derating voltage as represented by the low AC derating voltage signal ($V_{LOWACDERATE}$). If the test function 277 determines that the AC rms voltage is less than the low AC derating voltage, a computation device 279 produces the fifth current command signal according to the relation:

$$CCS5 = \frac{((V_{LOWACDERATE})-(V_{ACRMS}))(I_{CHARGERMAX})}{V_{LOWACDERATERANGE}}$$

If the test function 277 determines that the AC rms voltage is not less than the low AC derating voltage, an assignment function 281 sets the fifth current command signal equal to the maximum charger current signal ($I_{CHARGERMAX}$). The fifth current command signal is provided at an output 148 of the fifth current command signal generator to provide the fifth current command signal to the selector 104.

Referring to FIG. 2, the selector includes a store 280, such as a register or memory location for storing at least one of the plurality of current commands received at the current command signal inputs 150 through 158. Only one of the current command signals, for example, need be stored. In this embodiment, the first current command signal is initially stored in the store 280.

The selector 104 further includes a comparator 282 for performing a plurality of comparisons for successively comparing the contents of the store 280 with successive compared signals. A compared signal is one of the current command signals other than the one stored in the store 280. After each comparison, where the compared signal is less than the contents of the store 280, the contents of the store are replaced with a value representing the compared signal. Where the compared signal is not less than the contents of the store, the contents of the store are left the way they were before the comparison.

Figure 9:
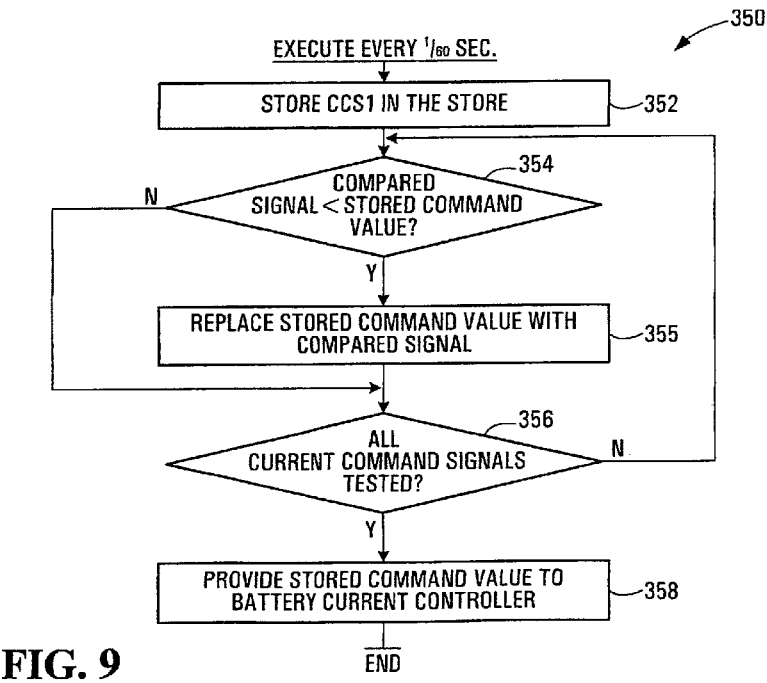
FIG. 9 is a flowchart illustrating the operation of a selector of the duty cycle controller apparatus shown in FIG. 2.

Referring to FIG. 9, a process executed by the selector 104 is shown generally at 350. The process is illustrated by representing blocks of code that may be stored in computer readable media and readable by a processor to direct the processor to carry out the process. In this regard, the process begins with a first block of codes 352 that directs the processor to store the first current command signal in the store 280. The block 354 directs the processor to select a compared signal, i.e. one of the second through fifth current command signals, and determine whether the compared signal is less than the signal stored in the store 280. If not, block 356 directs the processor to determine whether all current command signals have been compared to the contents of the store 280 and if not, to select the next current command signal and compare it to the contents of the store. If the currently compared current command signal is less than the contents of the store 280, block 355 directs the processor to replace the contents of the store with the currently compared signal. A block of codes 356 directs the processor to determine whether all current command signals have been subjected to this process. When all current command signals have been subjected to this process, block 358 directs the processor to provide the contents of the store 280 at the output 119 of the selector 104. When the process is finished, the contents of the store 280 thus represent the current command signal with the lowest value.

Thus, for example, the first current command signal is received in the store 280. Next, the second current command signal is used as a comparison signal and if the second current command signal is less than the contents of the store 280, i.e., currently the first current command signal, the store is replaced with the contents of the second current command signal. Then, the third current command signal is used as the compared signal and is compared by the comparator 282 to the contents of the store 280 which are currently the second current command signal. If the third current command signal is less than the current contents of the store 280, i.e., the second current command signal, the store is replaced with the third current command signal. Next, the fourth current command signal acts as the compared signal and the comparator compares the fourth current command signal with the contents of the store 280, i.e., the third current command signal. If the fourth current command signal is not less than the contents of the store 280, for example, the store is left undisturbed and remains holding the third current command signal. Then, the fifth current command signal acts as the compared signal and the comparator 282 compares the fifth current command signal to the contents of the store 280 which are currently set at the third current command signal. If the fifth current command signal is less than the contents of the store 280, the contents of the store are replaced with the fifth current command signal and the fifth current command signal is provided at the output 119 of the selector as the lowest current command signal.

As described earlier, the selector 104 may be implemented in the same digital signal processor that implements the current command signal generator, a separate digital signal processor or may be implemented as discrete hardware elements.

Referring back to FIG. 2, the duty cycle signal generator 106 comprises a power command generator 300 for generating a power command signal in response to the lowest current command signal and the battery current command signal received at the battery current signal input 114. In the embodiment shown, the power command generator includes a lowpass filter 302 for lowpass filtering the battery current signal and for providing it to a difference amplifier 304 that may provide gain and filter functions and ultimately compute a difference between the lowest current command signal and the battery current signal, to produce the power command signal at an output 306 thereof.

Up to and including the power command generator 300, the components may be configured to implement a "slow" control loop with a bandwidth of 10-20 Hz, for example. Sampling for digital signal processor implementations may be at 60 Hz, for example. The remainder of the components in the duty cycle controller 100 are desirably configured to implement a "fast" control loop having a bandwidth of perhaps more than 500 Hz and sampling rates of 12 kHz, for example may be used in DSP implementations of these components.

The duty cycle signal generator 106 further comprises an AC current command signal generator 308 for producing an AC current command signal in response to the power command signal produced by the power command generator 300 and the AC voltage waveform signal received at the AC voltage waveform input 118. In this embodiment, the AC current command signal generator 308 includes a multiplier 310 which multiplies the power command signal produced at the output 306 of the power command generator 300 with the AC voltage waveform signal received at the AC voltage waveform input 118. The multiplier has an output 312 at which the AC current command signal is produced.

The duty cycle signal generator 106 further comprises a duty cycle error signal generator shown generally at 314 for generating a duty cycle error signal in response to the AC current command signal from the output 312 of the AC current command signal generator 308, and the AC current waveform signal received at the AC current waveform input 120. In this embodiment the duty cycle error signal generator includes a difference amplifier 316 that may provide gain and filtering functions to the duty cycle error signal ultimately produced. The duty cycle error signal is produced at an output 318 of the duty cycle error signal generator 314.

The duty cycle signal generator 106 further includes a reference duty cycle generator 320 for producing a reference duty cycle signal at an output 322 thereof. The reference duty cycle generator 320 has an AC voltage signal input 324 for receiving the AC input voltage signal representing AC input voltage ($V_{AC}$) to the charger, as received at the AC voltage waveform input 118. In addition, the reference duty cycle signal generator 320 further includes a battery voltage signal input 326 for receiving the battery voltage signal received at the battery voltage signal input 116. The reference duty cycle signal generator further includes a turns ratio input 328 for receiving a signal representing the turns ratio of the transformer 36 shown in FIG. 1. The turns ratio may be computed from the $N_H$ and $N_L$ signals received at the inputs 254 and 256 of the fourth current command signal generator shown in FIG. 7, for example. The reference duty cycle signal generator further includes a computing function 330 for producing the reference duty cycle signal at the output 322 according to the relation:

$$\text{Ref Duty Cycle} = \frac{V_{AC}}{NV_{BATT}}$$

Still referring to FIG. 2, the duty cycle signal generator 106 further includes an adder 332 for adding the reference duty cycle signal produced at the output 322 to the duty cycle error signal produced at the output 318 to produce a duty cycle signal at an output 334 thereof. The duty cycle signal produced at the output 334 may be provided directly to the gate drive controller 98 shown in FIG. 1, but preferably is provided through a clamping function 335 which clamps the duty cycle signal to limits between minus one (−1) and one (1). Alternatively, other limits may be employed.

Desirably, the clamped duty cycle signal is provided at the output 124 of the duty cycle signal generator and is provided to the gate drive controller 98. The gate drive controller uses the duty cycle signal to produce gate drive signals G1, G2, G3 and G4 to control the transistors 52, 54, 56 and 58 to regulate current flow to the battery 66.

Figure 11:
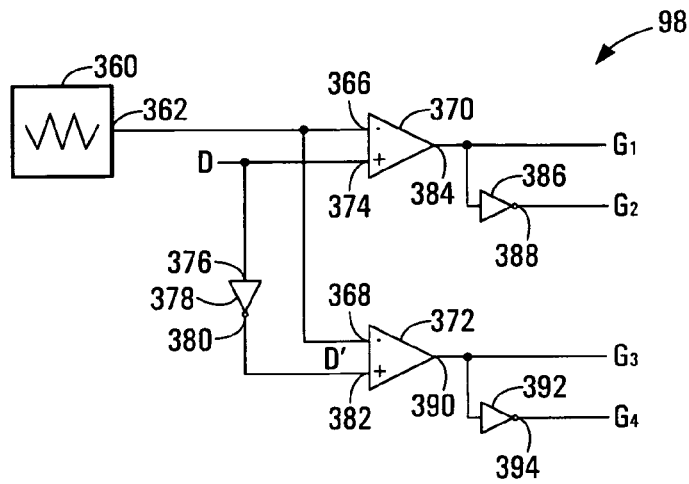
FIG. 11 is a schematic representation of a gate drive controller of the charger shown in FIG. 1.
Figure 12:
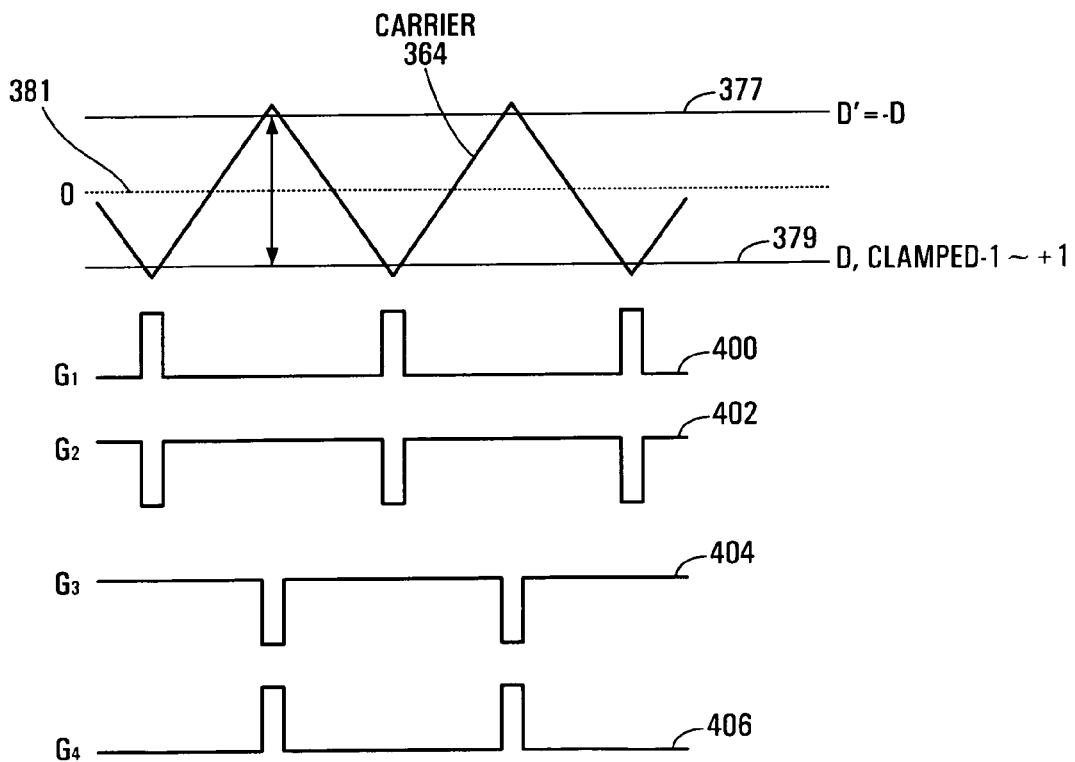
FIG. 12 is a schematic representation of waveforms of signals produced by or used by the gate drive controller shown in FIG. 11.

Referring to FIG. 11, in this embodiment, the gate drive controller 98 includes a triangle wave generator 360 having an output 362 for generating a triangle wave signal having voltage excursions symmetrically above and below zero as shown at 364 in FIG. 12. The triangle wave signal is applied to inverting inputs 366 and 368 of first and second comparators 370 and 372. The duty cycle signal output 124 shown in FIG. 2 is in communication with the non-inverting input 374 of the first comparator 370 and is further in communication with an input 376 of a polarity reverser 378, which reverses the polarity of the signal received at the input 376. As shown in FIG. 12, the duty cycle signal (D) is depicted at 377 and the same signal with reversed polarity (−D) is depicted at 379. Increasing the duty cycle signal causes the signals shown at 377 and 379 to spread apart symmetrically from a zero voltage reference 381 and decreasing the duty cycle signal causes them to move closer together symmetrically toward the zero voltage reference.

The polarity reverser 378 has an output 380 in communication with a non-inverting input 382 of the second comparator 372. The first comparator 370 has an output 384 that produces the first gate drive signal G1 and this output is connected to an inverter 386 having an output 388 for providing the second gate drive signal G2. The second comparator 372 has an output 390 that produces the third gate drive signal G3 and this output is connected to an inverter 392 having an output 394 for providing the fourth gate drive signal G4.

The effect of the gate drive signal circuit shown in FIG. 11 is shown in FIG. 12 in which gate drive signals G1-G4 are shown at 400, 402, 404 and 406 respectively. The gate drive signals G1-G4 are active only while the triangle waveform signal is above or below the duty cycle signals 377 and 379. Thus as the duty cycle signal increases, the time during which the transistors controlled by the gate drive signals are on is reduced and when the duty cycle signal decreases, the time during which the transistors controlled by the gate drive signals are on is increased. From the waveforms shown in FIG. 12, it will be appreciated that the clamp 335 shown in FIG. 2 is desirably set to clamp the duty cycle signal to a value corresponding to a peak of the triangle waveform produced by the triangle waveform generator 360.

Referring to FIG. 2, effectively, the first current command signal generator 130 produces a first current command signal on the basis of the battery voltage, battery type and charger mode. This would be a desirable current command signal if the charger were not subject to temperature increases due to current draw, sharing breaker capacity with other loads, phase control due to excessive AC input voltages relative to reflected battery voltages and AC input voltage fluctuations below nominal levels. The second, third, fourth and fifth current command signal generators 132, 134, 136, 138 provide current command signals that address each of these conditions and, in effect, the selector 104 shown in FIG. 2 acts to select the lowest current command signal value from among the five current command signals to operate the charger in a safe and reliable manner.

For example, when the second current control signal is lowest, the charger may be operating under conditions in which it could overheat, but this condition is prevented by the second current command signal. Alternatively, if the charger is operating in a mode in which current drawn from the second receptacle 44 shown in FIG. 1 in addition to the current drawn by the charger may exceed the current available from the breaker 26, the third current command signal may be lowest and will cause the duty cycle to be suitably adjusted to prevent overloading the breaker 26.

Alternatively, where the AC input voltage exceeds the reflected battery voltage through the turns ratio of the transformer such that the charger is placed in the phase control mode by the supervisory controller, the fourth current command signal may be the lowest current command signal, and thereby limit the duty cycle to prevent short circuit conditions from occurring in the low voltage circuit 14.

Alternatively, in the event that the AC input voltage is lower than a nominal AC voltage, the fifth current control signal generator 138 will generate a current control signal attempting to adjust the duty cycle to prevent excessive current from being drawn from the AC input.

Thus, various sets of operating conditions of the charger are used to establish a plurality of current command signals, the lowest of which is used to finally control the duty cycle to prevent inappropriate conditions being experienced or caused by the charger.

In some embodiments, fewer or more than the five current command signals described above may be used. For example, different combinations of current command signals may be used. In general, however, the first current command signal is important as this represents the theoretical best current command based strictly on battery parameters. The remaining current command signals are dependent upon other factors besides battery parameters. Thus, depending upon which set of parameters and conditions it is sought to guard against, the appropriate signal generators may be selected for inclusion.

While specific embodiments of the invention have been described and illustrated, such embodiments should be considered illustrative of the invention only and not as limiting the invention as construed in accordance with the accompanying claims.

What is claimed is:

1. A battery charger apparatus comprising, an AC input, a voltage circuit including a plurality of switches through which power is supplied to a charger output for suppling power to charge a battery in response to switching of the plurality of switches, a duty cycle controller for producing duty cycle signals for controlling switching of said plurality of switches while maintaining a high power factor at the AC input, the duty cycle controller including:
   a plurality of current command signal generators including
      a plurality of signal inputs that receive a plurality of signals representing a plurality of operating conditions of the charger and a battery being charged and a plurality of current command outputs;
   a processor that generates a plurality of current command signals at said plurality of current command outputs in response to the plurality of signals representing the plurality of operating conditions;
   a selector that compares the plurality of current command signals from said current command outputs and selects a current command signal having only a lowest value and produces a lowest current command signal output in response thereto; and
   a duty cycle signal generator having a lowest current command signal input, a battery current signal input, a battery voltage signal input, an AC voltage waveform input, an AC current waveform input and a duty cycle signal output, said duty cycle signal generator producing the duty cycle signals at said duty cycle signal output in response to said lowest current command signal, a battery voltage signal ($V_{BATT}$), a battery current signal ($I_{BATT}$), an AC voltage waveform signal ($V_{AC}$) and an AC current waveform signal ($I_{AC}$).

2. The apparatus of claim 1 wherein said current command signal generators include a first current command signal generator for generating a first current command signal (CCS1) relating to battery type and charger mode signals.

3. The apparatus of claim 2 wherein said first current command signal generator includes:
   battery type and charger mode signal inputs for receiving a battery type signal and a charger mode signal respectively;
   a battery voltage signal input for receiving said battery voltage signal ($V_{BATT}$);
   a battery voltage command signal generator operably configured to produce a battery voltage command signal in response to said battery type signal and said charger mode signal;
   a difference signal generator operably configured to produce said first current command signal in response to a difference between said battery voltage command signal and said battery voltage signal; and
   a first current command signal output for providing said first current command signal to said selector.

4. The apparatus of claim 3 wherein said current command signal generator includes a user interface for producing said battery type signal in response to user input identifying battery type.

5. The apparatus of claim 1 wherein said current command signal generator includes a second current command signal generator operably configured to produce a second current command signal (CCS2) relating to temperature conditions of the charger and charge current to be applied to the battery.

6. The apparatus of claim 5 wherein said second current command signal generator includes:
   a temperature signal input for receiving a temperature signal ($T_H$) representing a current temperature of the charger;
   a maximum temperature signal input for receiving a maximum temperature signal ($T_{MAX}$) representing maximum operating temperature of the charger;
   a derating range signal input for receiving a derating temperature range signal ($T_{DERATERANGE}$) specifying a range of temperature over which charging current must be reduced to avoid overheating the charger;
   a maximum charger current signal input for receiving a maximum charger current signal ($I_{CHARGERMAX}$) representing maximum charger current to be applied to the battery;
   a temperature ratio generator for generating a temperature ratio of a difference between said maximum temperature signal and said temperature signal to said temperature derate range signal;
   a multiplier for multiplying said maximum charger current signal by said temperature ratio to produce said second current command signal; and
   a second current command signal output for providing said second current command signal (CCS2) to said selector.

7. The apparatus of claim 6 further including a clamp for clamping said temperature ratio to an upper bound.

8. The apparatus of claim 6 further including a low pass filter for filtering said temperature signal prior to supplying said temperature signal to said temperature ratio generator.

9. The apparatus of claim 1 wherein said current command signal generator includes a third current command signal generator for generating a third current command signal (CCS3) relating to current being drawn by the charger from an AC source and a current battery voltage signal.

10. The apparatus of claim 9 wherein said third current command signal generator includes:
an efficiency signal input for receiving an efficiency signal (E) representing efficiency of the charger;
an AC rms voltage signal input for receiving an AC rms signal ($V_{ACRMS}$) representing input AC rms voltage;
a breaker derating signal input for receiving a breaker derating signal (B) representing a derating factor for derating a rated current of a breaker through which AC current is supplied to said charger;
a breaker rating current signal input for receiving a breaker rating current signal ($I_{BREAKERRATING}$) representing a rated current of the breaker through which current is supplied to the charger;
a load current signal input for receiving a load current signal ($I_{LOAD}$) representing load current supplied to a load connected to the same breaker through which current is supplied to the charger;
a battery voltage signal input for receiving said battery voltage signal ($V_{BATT}$);
a computation device in communication with said efficiency signal input, said ACrms voltage signal input, said breaker derating signal input, said breaker rating current signal input, said load current signal input and said battery voltage signal input, for producing said third current command signal (CCS3) according to the relation:

$$CCS3 = \frac{(E)(V_{ACRMS})((B)(I_{BREAKER}) - (I_{LOAD}))}{V_{BATT}}$$

and a third current command output for providing said third current command signal to said selector.

11. The apparatus of claim 10 wherein said third current command signal generator includes a user interface for producing said breaker rating current signal in response to user input.

12. The apparatus of claim 11 wherein said current command signal generator includes a user interface for producing said breaker derating signal in response to user input.

13. The apparatus of claim 1 wherein said current command signal generator includes a fourth current command signal generator for generating a fourth current command signal (CCS4) relating to phase operating characteristics of the charger.

14. The apparatus of claim 13 wherein said fourth current command generator includes:
a phase control mode signal input for receiving a phase control mode signal indicating whether or not said charger is operating in a phase control mode;
a battery voltage signal input for receiving said battery voltage signal ($V_{BATT}$);
a high side turns signal input for receiving a signal ($N_H$) representing the number of high side turns of wire on a high voltage side of a transformer of the charger;
a low side turns signal input for receiving a signal ($N_H$) representing the number of low side turns of wire on a low voltage side of the transformer;
an AC rms voltage signal input for receiving an AC rms signal ($V_{ACRMS}$) representing input AC rms voltage to the charger;
a maximum charger current signal input for receiving a maximum charger current signal ($I_{CHARGERMAX}$) representing maximum charger current;
a computation unit operable to compute said fourth current command signal (CCS4) according to the relation below when said phase mode signal indicates said charger is operating in a phase control mode:

$$CCS4 = \frac{(V_{BATT})(N_H) * (I_{CHARGERMAX})}{(N_L)(V_{ACRMS}) * 2\sqrt{2}}$$

and wherein said computation unit is operable to cause said fourth current command signal to be equal to said maximum battery current signal when said charger is not operating in said phase control mode; and
a fourth current command signal output for providing said fourth current command signal to said selector.

15. The apparatus of claim 1 wherein said current command signal generator includes a fifth current command signal generator for generating a fifth current command signal (CCS5) relating to low AC voltage.

16. The apparatus of claim 15 wherein said fifth current command signal generator includes:
a low AC voltage derating signal input for receiving a low AC voltage derating signal ($V_{LOWACDERATE}$);
an AC rms voltage signal input for receiving an AC rms voltage signal ($V_{ACRMS}$) representing input AC rms voltage;
a maximum charger current signal input for receiving a maximum charger current signal ($I_{BATTMAX}$) representing maximum charger current;
a low AC voltage derating range signal input for receiving a low AC voltage derating range signal ($V_{LOWACDERATERANGE}$);
a computation device connected to said low AC voltage derating signal input, said AC rms voltage signal input, said maximum charger current signal input and said low AC voltage derating range signal input, for producing said fifth current command signal (CCS5) according to the relation:

$$CCS5 = \frac{((V_{LOWACDERATE}) - (V_{ACRMS}))(I_{CHARGERMAX})}{V_{LOWACDERATERANGE}}$$

and a fifth current command signal output for providing said fifth current command signal (CCS5) to said selector.

17. The apparatus of claim 1 wherein said selector includes a store for storing at least one of said plurality of current command signals.

18. The apparatus of claim 17 wherein said selector further, includes a comparator for performing a plurality of comparisons for successively comparing the contents of said store with a compared signal, said compared signal being said current command signals other than said at least one of said plurality of current command signals, and after each comparison, where said compared signal is less than the contents of said store, replacing the contents of said store with a value representing the compared signal and where said compared signal is not less than the contents of said store, leaving the contents of the store as they were before the comparison.

19. The apparatus of claim 18 wherein said selector also includes a signal generator for producing said lowest current command signal in response to the contents of said store after performing. said plurality of comparisons.

20. The apparatus of claim 1 wherein said duty cycle signal generator includes a power command generator for generating a power command in response to said lowest current command signal and said battery current signal received at said battery current signal input.

21. The apparatus of claim 20 wherein said duty cycle signal generator further includes an AC current command signal generator for producing an AC current command signal in response to said power command signal and said AC voltage waveform signal received at said AC voltage waveform input.

22. The apparatus of claim 21 wherein said duty cycle signal generator includes a duty cycle error signal generator for generating a duty cycle error signal in response to said AC current command signal and said AC current waveform signal received at said AC current waveform input.

23. The apparatus of claim 22 wherein said duty cycle signal generator includes a reference duty cycle generator for producing a reference duty cycle signal, said reference duty cycle generator having:
- an AC voltage signal input for receiving an AC input voltage signal representing AC input voltage ($V_{AC}$) to the charger; a battery voltage signal input for receiving said battery voltage signal representing battery voltage ($V_{BATT}$);
- a turns ratio input for receiving a signal representing a turns ratio (N) of a transformer of said charger;
- a computing function for producing said reference duty cycle signal according to the relation:

$$Ref\ Duty\ Cycle = \frac{V_{AC}}{NV_{BATT}}.$$

24. The apparatus of claim 23 wherein said duty cycle signal generator includes an adder for adding said reference duty cycle signal and said duty cycle error signal to produce said duty cycle signal.

25. The apparatus of claim 24 wherein said duty cycle signal generator includes a clamp for bounding said duty cycle signal.

26. The apparatus of claim 1 wherein said signal inputs include:
- a plurality of inputs for receiving signals representing measured quantities measured variables;
- a plurality of inputs for receiving user-supplied variables; and a plurality of inputs for receiving a plurality of fixed values.

27. The apparatus of claim 26 wherein said plurality of inputs for receiving measured variables includes inputs for receiving signals representing: input AC voltage, input AC current, temperature of charger, charger mode, phase control mode and load current.

28. The apparatus of claim 26, wherein said plurality of inputs for receiving user supplied variables includes a plurality of inputs for receiving signals representing: battery type, battery size and breaker rating of a breaker through which AC current is supplied to the battery charger.

29. The apparatus of claim 26 wherein said plurality of inputs for receiving fixed values includes inputs for receiving signals representing: maximum allowable temperature of the charger; a derating range over which current output of the charger is derated due to temperature, a temperature ratio clamping value specifying a temperature ratio that cannot be exceeded, a breaker derating value representing a factor for derating a breaker through which AC current for the charger is supplied, an efficiency value representing the efficiency of the charger, a number representing the number of turns on a high voltage side of a transformer of the charger, a number representing the number of turns on a low voltage side of the transformer of the charger, a voltage value representing a low AC voltage value below which output current of the charger is to be derated, a voltage range value representing a range of AC input voltages for which the output current of the charger should be derated and a maximum charger current.

30. A battery charger comprising the duty cycle controller of claim 1 and further including:
- a gate drive controller operable to receive said duty cycle signal and operable to produce at least one gate drive signal in response to said duty cycle signal; and
- a switching circuit for switching current to a battery being charged by the battery charger, said switching circuit being controlled by said at least one gate drive signal.

* * * * *